(12) United States Patent
Forti et al.

(10) Patent No.: US 7,937,206 B2
(45) Date of Patent: May 3, 2011

(54) FUEL MIXTURE AUTOIGNITION CONTROL METHOD, NOTABLY FOR DIESEL TYPE INTERNAL-COMBUSTION ENGINES, AND ENGINE USING SAME

(75) Inventors: Laurent Forti, Cergy (FR); Nicolas Jeuland, Paris (FR); Bertrand Lecointe, Triel sur Seine (FR); Xavier Montagne, Rueil Malmaison (FR)

(73) Assignee: Institut Francais du Petrole, Cedex (FR)

( * ) Notice: Subject to any disclaimer, the term of this patent is extended or adjusted under 35 U.S.C. 154(b) by 322 days.

(21) Appl. No.: 12/089,794

(22) PCT Filed: Oct. 11, 2006

(86) PCT No.: PCT/FR2006/002291
§ 371 (c)(1),
(2), (4) Date: Oct. 9, 2008

(87) PCT Pub. No.: WO2007/042674
PCT Pub. Date: Apr. 19, 2007

(65) Prior Publication Data
US 2009/0216423 A1     Aug. 27, 2009

(30) Foreign Application Priority Data
Oct. 11, 2005  (FR) ..................................... 05 10402

(51) Int. Cl.
*G06F 19/00* (2006.01)
*F02B 47/04* (2006.01)
*F02M 25/14* (2006.01)
*F02M 43/00* (2006.01)

(52) U.S. Cl. ......... 701/103; 701/111; 123/1 A; 123/304; 123/435

(58) Field of Classification Search .................. 123/1 A, 123/3, 27 R, 27 GE, 304, 435, 436, 478, 123/480, 494, 525–527, 575; 701/101–105, 701/111, 114, 115; 73/114.38, 114.53, 114.54; 702/182, 183; 44/603
See application file for complete search history.

(56) References Cited

U.S. PATENT DOCUMENTS

| | | | |
|---|---|---|---|
| 6,463,907 B1 * | 10/2002 | Hiltner | 123/304 |
| 6,786,938 B1 * | 9/2004 | Cemenska et al. | 44/301 |
| 7,213,567 B2 * | 5/2007 | Cracknell | 123/304 |
| 2002/0157619 A1 * | 10/2002 | Gray | 123/1 A |
| 2004/0060229 A1 * | 4/2004 | Todd et al. | 44/603 |
| 2004/0099226 A1 * | 5/2004 | Bromberg et al. | 123/3 |

FOREIGN PATENT DOCUMENTS

| | | | | |
|---|---|---|---|---|
| EP | 1 435 442 A1 | 7/2004 | | |
| EP | 1 582 723 A2 | 10/2005 | | |
| GB | 2163878 A  * | 3/1986 | | 44/603 |

* cited by examiner

*Primary Examiner* — Willis R Wolfe, Jr.

(74) *Attorney, Agent, or Firm* — Antonelli, Terry, Stout & Kraus, LLP.

(57) ABSTRACT

The present invention relates to a method for controlling autoignition of a fuel mixture, notably for a diesel type internal-combustion engine, according to which a fuel mixture is made in at least one combustion chamber (14) of the engine with a fuel and at least one fluid in order to obtain a homogeneous type combustion by autoignition. The method includes defining a desired combustion progress by autoignition of the fuel mixture, and adjusting the cetane number of the fuel used for the mixture to that of the fuel providing the desired combustion progress is obtained.

22 Claims, 1 Drawing Sheet

FUEL MIXTURE AUTOIGNITION CONTROL METHOD, NOTABLY FOR DIESEL TYPE INTERNAL-COMBUSTION ENGINES, AND ENGINE USING SAME

BACKGROUND OF THE INVENTION

1. Field of the Invention

The present invention relates to a method for controlling autoignition of a fuel mixture, notably for a diesel type internal-combustion engine, and to an engine using same.

2. Description of the Prior Art

Within the field of engine development, notably diesel type engines, the assignee's constant concern is to reduce the fuel consumption and emissions such as soot and nitrogen oxides ($NO_x$). The assignee has therefore continued work in the field of the ignition combustion mode by compression of a homogeneous feed (referred to as HCCI for Homogeneous Combustion Compression Ignition) whose goal is to significantly reduce the consumption as well as emissions over a wide range of use of these engines, while maintaining their performance.

Thus, for this type of HCCI combustion mode, the conventional combustion by diffusion of fuel conventionally ignited by compression of air or of a mixture of air and of burnt gas is to be replaced by a long-lasting combustion by autoignition of a fuel mixture. This long duration thus allows mixing the fuel coming from an injection nozzle with the gaseous fluid(s) induced into the combustion chamber of the engine, such as air or a mixture of air and of recirculated exhaust gas (EGR), so as to obtain a nearly homogeneous fuel mixture before combustion starts.

Thus, during the progress of the engine compression phase, the fuel mixture reaches a certain temperature and pressure threshold, and combustion of this mixture occurs through autoignition.

This homogeneous type of combustion allows reducing of the fuel consumption and minimizing the production of nitrogen oxides ($NO_x$) and of particles upon combustion.

However, this type of combustion involves quite significant drawbacks.

In fact, to achieve this homogeneous type combustion, it is essential to control the progress of the combustion and timing thereof in the engine cycle. This requires good combustion timing, that is the exact time when the fuel mixture ignites in relation to the engine cycle, and control of the fuel mixture autoignition duration. In fact, autoignition must start when the piston has reached its adequate position, generally in the vicinity of the top dead center (TDC), at the time when the fuel mixture has all the physico-chemical characteristics required for autoignition, and it must end in the vicinity of the bottom dead center of the piston.

It has thus been observed that a shift in start of autoignition, advanced in relation to the position of the piston or retarded in relation to this position, as well as too long or too short a combustion duration, have the effect of generating combustion noise, increased fuel consumption, decreased engine efficiency and emission of a large amount of pollutants such as nitrogen oxides.

Furthermore, the cetane number of the fuel used is one of the parameters to be taken into account for controlling the fuel mixture autoignition process, but combustion timing is dependent on the engine working point, regarding the pressure as well as the temperature of the engine. A compromise over the cetane number is therefore necessary to be able to operate the engine over all the engine speed and load ranges thereof.

The present invention thus aims to overcome the aforementioned drawbacks by providing a fuel mixture autoignition control method allowing the fuel properties to be adjusted to the combustion requirements.

SUMMARY OF THE INVENTION

The present invention relates to a method for controlling autoignition of a fuel mixture, notably for a diesel type internal-combustion engine, according to which a fuel mixture is prepared in at least one combustion chamber of the engine with a fuel and at least one fluid in order to obtain a homogeneous type combustion by autoignition, including:

a) defining a desired progress of the combustion by autoignition of the fuel mixture;

b) adjusting a cetane number of the fuel used for the mixture to that of the fuel allowing a desired combustion progress to be obtained.

The method can define the cetane number of the fuel to be injected into the combustion chamber so as to correspond to the desired autoignition combustion process and in adjusting the cetane number of the fuel used for the mixture to the defined cetane number.

This method can evaluate the pressure signal in the combustion chamber so as to correspond to the desired autoignition combustion process, in measuring the real pressure signal in these chambers and in adjusting the cetane number of the fuel used for the mixture so that the real pressure signal corresponds to the evaluated pressure signal.

The method can adjust the cetane number of the fuel used for the mixture by providing additives.

The method can combine with the fuel used for the mixture at least one additive selected from among the nitrate type molecules.

The method can combine with the fuel used for the mixture at least one additive selected from among the peroxide type molecules.

Preferably, it can use a 2-ethylhexylnitrate type additive.

This method can use a di-tertiobutylperoxide type additive.

The method can also combine the additive with the fuel used for the mixture prior to feeding this fuel into the combustion chamber.

Similarly, it can feed the additive and the fuel used for the mixture separately into the combustion chambers.

The invention also relates to an internal-combustion engine, notably of diesel type, comprising at least one cylinder with a combustion chamber wherein a homogeneous type combustion takes place by autoignition of a mixture of a fuel with at least one fluid, including means for varying the cetane number of the fuel.

The means for varying fuel cetane number can comprise means for providing at least one additive to the fuel used for the mixture.

The means for providing at least one additive can include at least one additive tank and a metering pump injecting additive into the fuel used for the mixture so that the at least one additive and fuel combine prior to being fed into the combustion chamber.

The means for providing at least one additive can comprise at least one additive tank and means for injecting the additive into the combustion chamber.

BRIEF DESCRIPTION OF THE DRAWINGS

Other features and advantages of the invention will be clear from reading the description hereafter, given by way of non limitative example, with reference to the accompanying figures wherein.

DETAILED DESCRIPTION OF THE INVENTION

Figure 1:
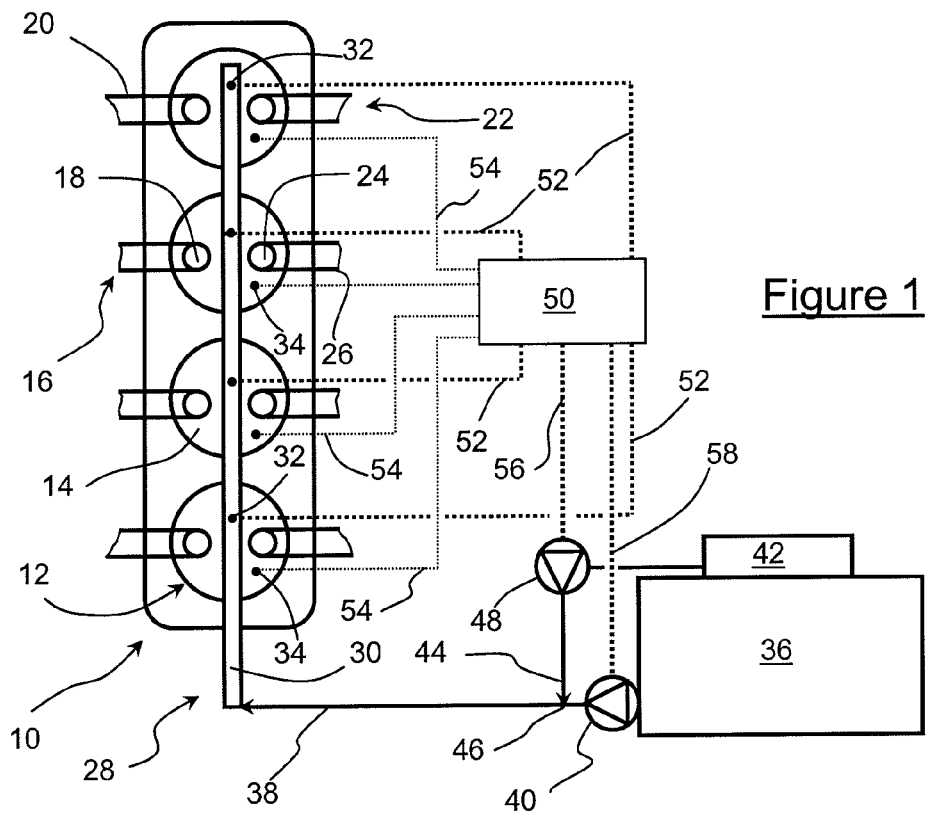
FIG. 1 diagrammatically shows an internal-combustion engine using the method according to the invention.

In FIG. 1, internal-combustion engine 10, notably of diesel type, comprises at least one cylinder 12 with a combustion chamber 14 communicating with intake means 16 comprising an intake valve 18 controlling an intake pipe 20 and exhaust means 22 with an exhaust valve 24 associated with an exhaust pipe 26. This engine also comprises fuel injection means 28 that are, in the example of FIG. 1, an injection ramp 30 and injection nozzles 32 for injecting fuel directly into the combustion chambers. Advantageously, a pressure detector 34 communicates with the combustion chamber and allows the evolution of the pressure inside this chamber to be measured. This detector notably allows the combustion process to be analyzed in this chamber.

The fuel injection means, and more particularly ramp 30, are connected to a fuel tank 36 by a line 38. A suction pump, referred to as fuel pump 40, allows fuel to be sent from this tank to ramp 30 via line 38.

A tank 42, containing an additive or a mixture of additives, is associated with engine 10 and a line 44 goes from this additive tank and ends at an intersection 46 with fuel line 38. A metering pump 48 allows the desired amount of additive to be fed into line 38 so that the additive combines with the fuel circulating therein. Advantageously, in order to obtain good combination between the base fuel and the additive, intersection 46 is to be located upstream from fuel pump 40.

Of course, there can be a multiplicity of tanks each containing a different additive, or a mixture of additives, comprising lines carrying metering pumps and connected to the fuel line.

Advantageously, the base fuel contained in tank 36 is a diesel type fuel with a cetane number of the order of 30 to 50, which allows obtaining a long-lasting fuel mixture autoignition duration. Additive tank 42 contains at least one additive, referred to as procetane additive, which allows, when combined with the fuel, increasing the cetane number of the fuel and consequently to reduce the autoignition duration of the fuel mixture thus obtained. Preferably, this additive is selected from among molecules of very short autoignition duration such as nitrates, such as 2-ethylhexylnitrate for example, or peroxides such as di-tertiobutylperoxide. What is referred to as autoignition duration is the time elapsed between the start of fuel injection into the combustion chamber and the time when the fuel mixture ignites.

As it is well known, an engine control and calculating unit, referred to as engine calculator 50, is associated with the engine. This calculator notably allows controlling each fuel injection nozzle 32 through a bidirectional line 52 and it also receives information from pressure detectors 34 through communication channels 54. The calculator also allows controlling metering pump 48 through a line 56 and to activate fuel pump 40 via a line 58.

This calculator also comprises mappings or data charts allowing evaluation, according to the engine running conditions, such as the engine speed, the load or the torque requirement and the type of combustion mode (homogeneous or conventional type). In case of homogeneous type combustion, this calculator defines the parameters for the desired combustion process by autoignition, such as the time of autoignition of this mixture in the engine cycle, the duration of this autoignition. According to this information on the autoignition, the desired cetane number to be injected into combustion chamber 14 through injection nozzles 32 to obtain such an autoignition. According to this number, the calculator, also by means of a data chart, determines the amount of additive to be fed into line 38 by metering pump 48 so as to combine with the fuel circulating therein. It consequently controls the metering pump in such a way that the combination of the additive with the base fuel allows obtaining a fuel with a suitable cetane number in order to obtain the desired progress for the combustion by autoignition. The fuel with additive thus obtained is then fed, in the desired proportion, into the combustion chambers by nozzles 32 controlled by calculator 50.

The combustion by autoignition of a fuel with an ideal cetane number is continuously monitored by pressure detectors 34 whose signals are sent to the calculator. Thus, in case of drift, the calculator adjusts the cetane number of the fuel so as to obtain ideal combustion conditions in chamber 14.

Alternatively, the amount of additive to be fed into the line is not determined by means of data charts or mappings giving the desired fuel cetane number according to the engine running conditions, but by loop monitoring of the combustion progress through analysis of the pressure signal measured in the combustion chambers and sent by detectors 34 to engine calculator 50 through channels 54.

In fact, this signal is representative of the combustion progress in the combustion chamber and has a pressure peak indicating the start of autoignition at a given time in the engine cycle, by a pressure maintained substantially constant for the development of the autoignition for a predetermined time, then by a drop in this pressure indicating the end of the autoignition of the fuel mixture. Thus, for a given engine running condition, the ideal evolution of the signal relative to the desired pressure in the combustion chambers is known for a desired combustion. Any deviation of the measured pressure in relation to this signal, at the start of the combustion as well as throughout the duration thereof, therefore means that the cetane number of the fuel contained in the fuel mixture is not suited for the combustion. In this case, the calculator can correct, by adding additives, the cetane number of the fuel injected into the combustion chambers in the next combustion cycle. The calculator therefore controls the activation of metering pump 48 so as to inject a predetermined amount of additive into fuel line 38. This amount to be injected is determined by the calculator that contains a corrective table quantifying the proportion of additive to be combined with the fuel so as to obtain a fuel with a suitable cetane number allowing elimination of the difference between the measured pressures and the desired pressures.

Thus, providing at least one additive to the fuel allows variation the cetane number of the fuel and adjustment thereof to the desired combustion characteristics without modifying the engine running parameters, such as advanced injection.

Figure 2:
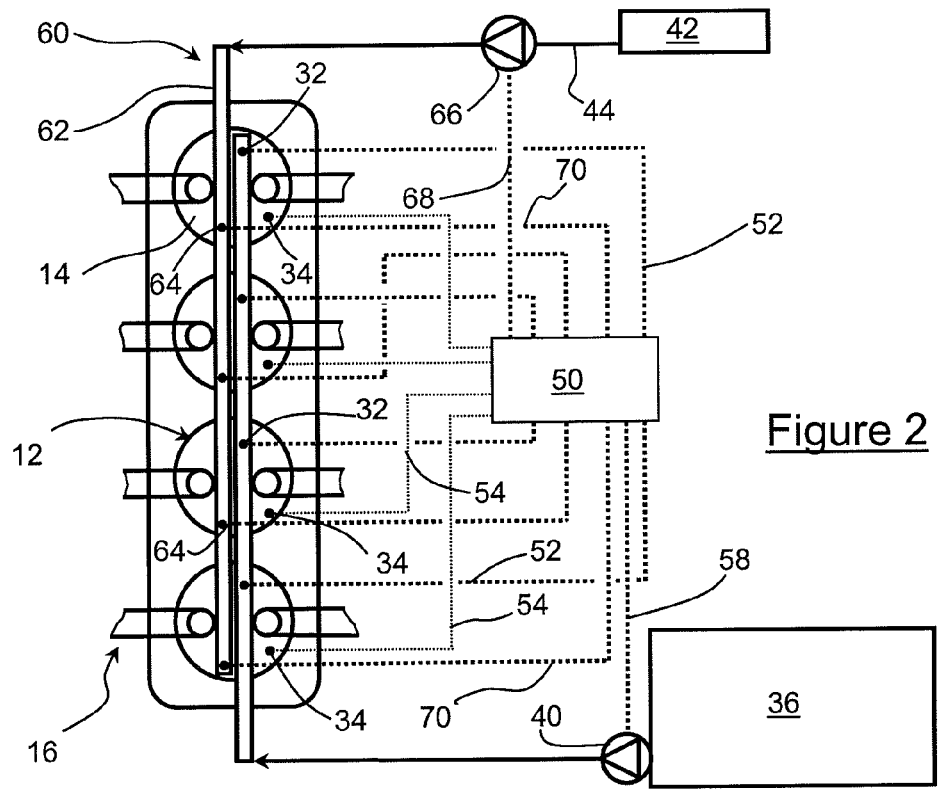
FIG. 2 is an alternative embodiment of the invention from the internal-combustion engine of FIG. 1.

The alternative embodiment of FIG. 2 essentially comprises the same elements as those shown in FIG. 1 and it therefore has the same reference numbers for the elements common to the two figures.

This embodiment differs from FIG. 1 in that the addition of at least one additive is no longer performed in fuel line 38 but directly in combustion chambers 14 of the engine.

Additive injection means 60 allowing at least one additive to be fed directly into these combustion chambers are therefore provided. As illustrated in FIG. 2 by way of example, the injection means has an injection ramp 62 connected to additive injectors 64. In this case, additive tank 42 is connected to ramp 62 by line 44 carrying an additive circulation pump 66 instead of the metering pump of FIG. 1. This circulation pump is controlled by a control line 68 connected to engine calculator 50. Control lines 70, also connected to this engine calculator, allow controlling the amount of additive fed into the combustion chambers by injectors 64.

The alternative engine embodiment of FIG. 2 works in the same way as the engine described in FIG. 1.

Thus, after the desired fuel cetane number has been determined by the calculator, the calculation also determines, still using charts or mappings, the amounts of base fuel and of additive to be fed into combustion chambers 14 to obtain a fuel with at least one additive with a cetane number allowing the desired combustion by autoignition to take place. Consequently, calculator 50 controls fuel injection nozzles 32 and additive injectors 64 in such a way that the determined amounts of fuel and of additive are fed into the combustion chambers. The fuel and the at least one additive combine therein so as to make up the fuel with the desired cetane number, which then forms, with the fluid(s) introduced through intake means 16, a fuel mixture.

Similarly, in the case of loop monitoring of the combustion progress by pressure detectors 34, the amount of fuel and of at least one additive to be fed into the combustion chambers is also determined by the calculator to eliminate the pressure difference between the measured pressures and the desired pressures.

Thus, adding the at least one additive to the base fuel allows adjustment of fuel with at least one additive to the various engine operating ranges.

The present invention is not limited to the embodiment examples described above and it encompasses any variant and equivalent.

The invention claimed is:

1. A method for controlling autoignition of a fuel mixture of at least one fluid and fuel by an internal-combustion engine provided with at least one combustion chamber, to obtain homogeneous combustion by autoignition, comprising:
   defining a desired autoignition combustion of the fuel mixture;
   adjusting a cetane number of the fuel provided with the fuel mixture to the at least one combustion chamber so that the desired autoignition combustion is obtained;
   measuring a pressure signal representative of real pressure in the at least one combination chamber; and
   adjusting the cetane number of the fuel used for the fuel mixture so that the real pressure signal corresponds to the determined pressure signal.

2. An autoignition control method as claimed in claim 1, comprising defining the cetane number of the fuel to be injected into combustion chamber to correspond to the desired autoignition combustion and adjusting the cetane number of the fuel used for the fuel mixture to the defined number.

3. An autoignition control method as claimed in claim 2, comprising adjusting the cetane number of the fuel used for the fuel mixture.

4. An autoignition control method as claimed in claim 3, comprising combining with the fuel used for the mixture at least one additive selected from among molecules containing nitrate.

5. An autoignition control method as claimed in claim 4, comprising using an additive containing 2-ethylhexylnitrate.

6. An autoignition control method as claimed in claim 3, comprising combining with the fuel used for the mixture at least one additive selected from among molecules containing peroxide.

7. An autoignition control method as claimed in claim 6, comprising using an additive containing di-tertiobutylperoxide.

8. An autoignition control method as claimed in claim 1, comprising adjusting the cetane number of the fuel used for the fuel mixture.

9. An autoignition control method as claimed in claim 8, comprising combining the additive with the fuel used for the mixture prior to feeding the fuel into the at least one combustion chamber.

10. An autoignition control method as claimed in claim 8, comprising separately feeding the additive and the fuel used for the mixture into the at least one combustion chamber.

11. An autoignition control method as claimed in claim 8, comprising combining with the fuel used for the mixture at least one additive selected from among molecules containing nitrate.

12. An autoignition control method as claimed in claim 11, comprising combining the additive with the fuel used for the mixture prior to feeding the fuel into the at least one combustion chamber.

13. An autoignition control method as claimed in claim 11, comprising separately feeding the additive and the fuel used for the mixture into the at least one combustion chamber.

14. An autoignition control method as claimed in claim 11, comprising using an additive containing 2-ethylhexylnitrate.

15. An autoignition control method as claimed in claim 14, comprising combining the additive with the fuel used for the mixture prior to feeding the fuel into the at least one combustion chamber.

16. An autoignition control method as claimed in claim 14, comprising separately feeding the additive and the fuel used for the mixture into the at least one combustion chamber.

17. An autoignition control method as claimed in claim 8, comprising combining with the fuel used for the mixture at least one additive selected from among molecules containing peroxide.

18. An autoignition control method as claimed in claim 17, comprising combining the additive with the fuel used for the mixture prior to feeding the fuel into the at least one combustion chamber.

19. An autoignition control method as claimed in claim 17, comprising separately feeding the additive and the fuel used for the mixture into the at least one combustion chamber.

20. An autoignition control method as claimed in claim 17, comprising using an additive containing di-tertiobutylperoxide.

21. An autoignition control method as claimed in claim 20, comprising combining the additive with the fuel used for the mixture prior to feeding the fuel into the at least one combustion chamber.

22. An autoignition control method as claimed in claim 20, comprising separately feeding the additive and the fuel used for the mixture into the at least one combustion chamber.

* * * * *